(12) United States Patent
Liao

(10) Patent No.: US 10,228,798 B2
(45) Date of Patent: Mar. 12, 2019

(54) DETECTING METHOD OF TOUCH SYSTEM FOR AVOIDING INADVERTENT TOUCH

(71) Applicants: IMAGINATION BROADWAY LTD., New Taipei (TW); SALT International Corp., New Taipei (TW)

(72) Inventor: Zong-Bin Liao, New Taipei (TW)

(73) Assignees: IMAGINATION BROADWAY LTD., New Taipei (TW); SALT INTERNATIONAL CORP., New Taipei (TW)

( * ) Notice: Subject to any disclaimer, the term of this patent is extended or adjusted under 35 U.S.C. 154(b) by 6 days.

(21) Appl. No.: 15/386,875

(22) Filed: Dec. 21, 2016

(65) Prior Publication Data

US 2017/0185227 A1  Jun. 29, 2017

(30) Foreign Application Priority Data

Dec. 23, 2015  (TW) .............................. 104143351 A

(51) Int. Cl.
*G06F 3/041* (2006.01)
*G06F 3/01* (2006.01)
*G06F 3/044* (2006.01)

(52) U.S. Cl.
CPC ............ *G06F 3/0418* (2013.01); *G06F 3/017* (2013.01); *G06F 3/044* (2013.01); *G06F 2203/04104* (2013.01)

(58) Field of Classification Search
None
See application file for complete search history.

(56) References Cited

U.S. PATENT DOCUMENTS

2014/0028575 A1\* 1/2014 Parivar ................. G06F 3/0414
345/173

\* cited by examiner

*Primary Examiner* — Brian M Butcher
(74) *Attorney, Agent, or Firm* — WPAT, PC

(57) ABSTRACT

A detection method of touch system for avoiding inadvertent touch is disclosed. The steps of the detection method includes: obtaining a plurality of first detection signals; determining whether a difference of strength between the first detection signals is less than a default difference; calculating a first centroid on the first detection signals, which if the difference of strength between the first detection signals is less than the default difference; setting a first rejection area extrapolated from the first centroid; obtaining a plurality of second detection signals for determining whether to update the first rejection area; calculating a second centroid on the second detection signals; calculating a rate of the first centroid to the second centroid; and, proceeding an update for replacing the first rejection area with a second rejection area extrapolated from the second centroid, if the rate is greater than a default value.

21 Claims, 6 Drawing Sheets

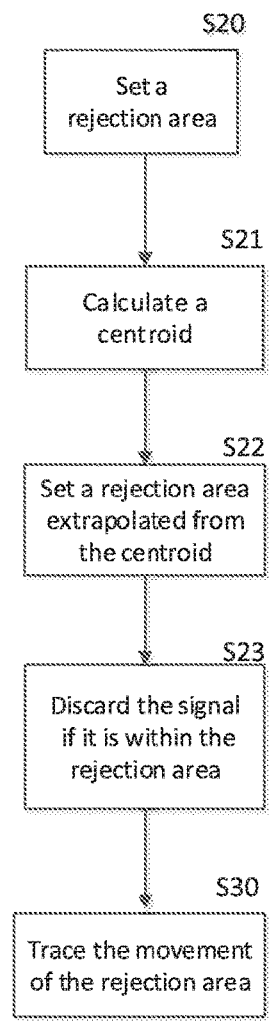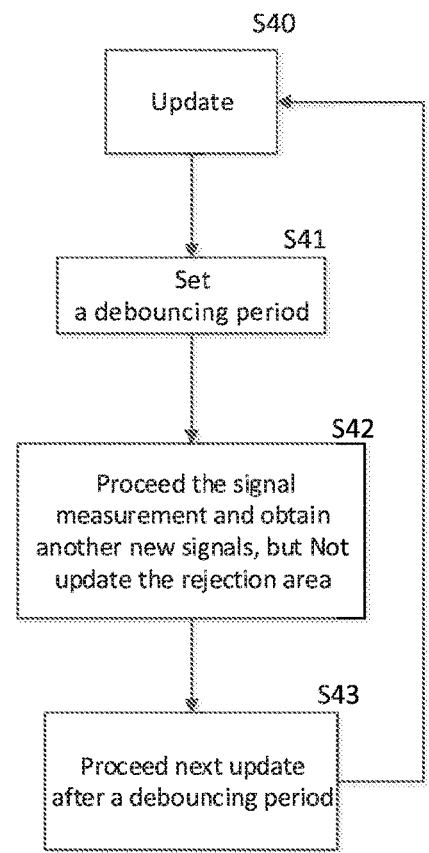
Fig.2B                    Fig.2C

DETECTING METHOD OF TOUCH SYSTEM FOR AVOIDING INADVERTENT TOUCH

CROSS-REFERENCE TO RELATED APPLICATIONS

This application claims the benefit of priority to Taiwan patent application Ser. No. 104143351 entitled "DETECTING METHOD OF TOUCH SYSTEM FOR AVOIDING INADVERTENT TOUCH", filed Dec. 23, 2015, which is also incorporated herein by reference.

FIELD OF THE INVENTION

The present invention pertains to a detection method of touch system, and particularly relates to a detection method for avoiding inadvertent touch.

BACKGROUND OF THE INVENTION

A touch panel or touch screen is one of the major interfaces between human and machine, and as a recognition device, can ingeniously combine input and display interfaces, and therefore has the advantages of saving device space and user-friendly operation. Nowadays it has been generally applied to a wide variety of consuming or industrial electronic products. For example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points-of-Sale), etc., which can generally be seen in various occasions of business and industry applications.

With the touch panel widely applied in a variety of electronic products, users have more need for the medium and large panel. However, users must hang their wrist and even hang their palm to operate the larger panel. It causes inconvenience and fatigue in use, so users still prefer to use mouse or keyboard as major input interface after the early adopters use touch interface. For avoiding that wrist or palm inadvertently touches the panel, how to effectively determine the signal caused by wrist or palm and to prevent wrist or palm from interfering the detection result is the most important issue in touch technology, so user's wrist or palm can be easily placed on the panel.

SUMMARY OF THE PRESENT INVENTION

The present invention provides a detection method of touch system for avoiding the inadvertent signals generated by user's wrist or palm inadvertently touching the touch panel.

In order to achieve one, some or all of the above stated objectives or others, a detection method of touch system for avoiding inadvertent touch according to the first embodiment of the present invention is provided. The steps of the detection method include: obtaining a plurality of first detection signals; determining whether a difference of strength between the first detection signals is less than a default difference; calculating a first centroid on the first detection signals, which if the difference of strength between the first detection signals is less than the default difference; setting a first rejection area extrapolated from the first centroid; obtaining a plurality of second detection signals for determining whether to update the first rejection area; calculating a second centroid on the second detection signals; calculating a rate of the first centroid to the second centroid; and, proceeding an update for replacing the first rejection area with a second rejection area extrapolated from the second centroid if the rate is greater than a default value; wherein proceeding next update after a debouncing period is through.

In order to achieve one, some or all of the above stated objectives or others, a detection method of touch system for avoiding inadvertent touch according to the second embodiment of the present invention is provided. The steps of the detection method include: obtaining a plurality of first detection signals; determining whether a distance of any two of the first detection signals is less than a first default distance; calculating a first centroid on the first detection signals, which if the distance of the two of the first detection signals is less than a first default distance; setting a first rejection area extrapolated from the first centroid; obtaining a plurality of second detection signals for determining whether to update the first rejection area; increasing the count by one if the distance of any two of the second detection signals is less than a second default distance; and, proceeding an update for replacing the first rejection area with a second rejection area extrapolated from a second centroid if the number of the counts is more than a default number; wherein proceeding next update after a debouncing period is through.

In the first or second embodiment, the centroid is calculated on the strength and the position of the detection signals.

In the first or second embodiment, further includes the step of obtaining a third detection signal during the debouncing period, and determining whether the position of the third detection signal is within the first or second rejection area; discarding the third detection signal if the position of the third detection signal is within the first or second rejection area; if not, outputting the third detection signal.

In the first or second embodiment, after the step of calculating the second centroid is finished, ceasing the following step if the position of the second centroid is the same as that of the first centroid.

In order to achieve one, some or all of the above stated objectives or others, a detection method of touch system for avoiding inadvertent touch according to the third embodiment of the present invention is provided. The steps of the detection method include: determining whether a plurality of first detection signals are generated by inadvertent touch; calculating a first centroid on the first detection signals if the first detection signals are generated by inadvertent touch; setting a first rejection area extrapolated from the first centroid; obtaining at least one or more second detection signals for determining whether to update the first rejection area; and, proceeding an update for replacing the first rejection area with a second rejection area extrapolated from a second centroid; wherein proceeding next update after a debouncing period is through.

By setting a rejection area base on the detection signals generated by user's wrist or palm inadvertently touching, the detection signals generated by inadvertent touch is avoided to be misjudged in touch system according to the embodiment of the present invention. It is determined whether a new rejection area is updated based on the detection signals generated by inadvertent touch when user moves his wrist or palm; and furthermore, next update is proceeded after a debouncing period is through, so that the contact area shrinking to a point is avoided to be misjudged when user lifts up his wrist or palm on the touch panel.

BRIEF DESCRIPTION OF THE DRAWINGS

FIG. 2 and FIG. 2A-2C depict flow charts of the detection method for avoiding inadvertent touch according to an embodiment of the present invention.

DETAILED DESCRIPTION OF THE INVENTION

The present invention can be more fully understood by reading the following detailed description of the preferred embodiments, with reference made to the accompanying drawings. It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. References cited herein are hereby incorporated by reference in their entirety, except to the extent that they conflict with teachings explicitly set forth in this specification.

Figure 1:
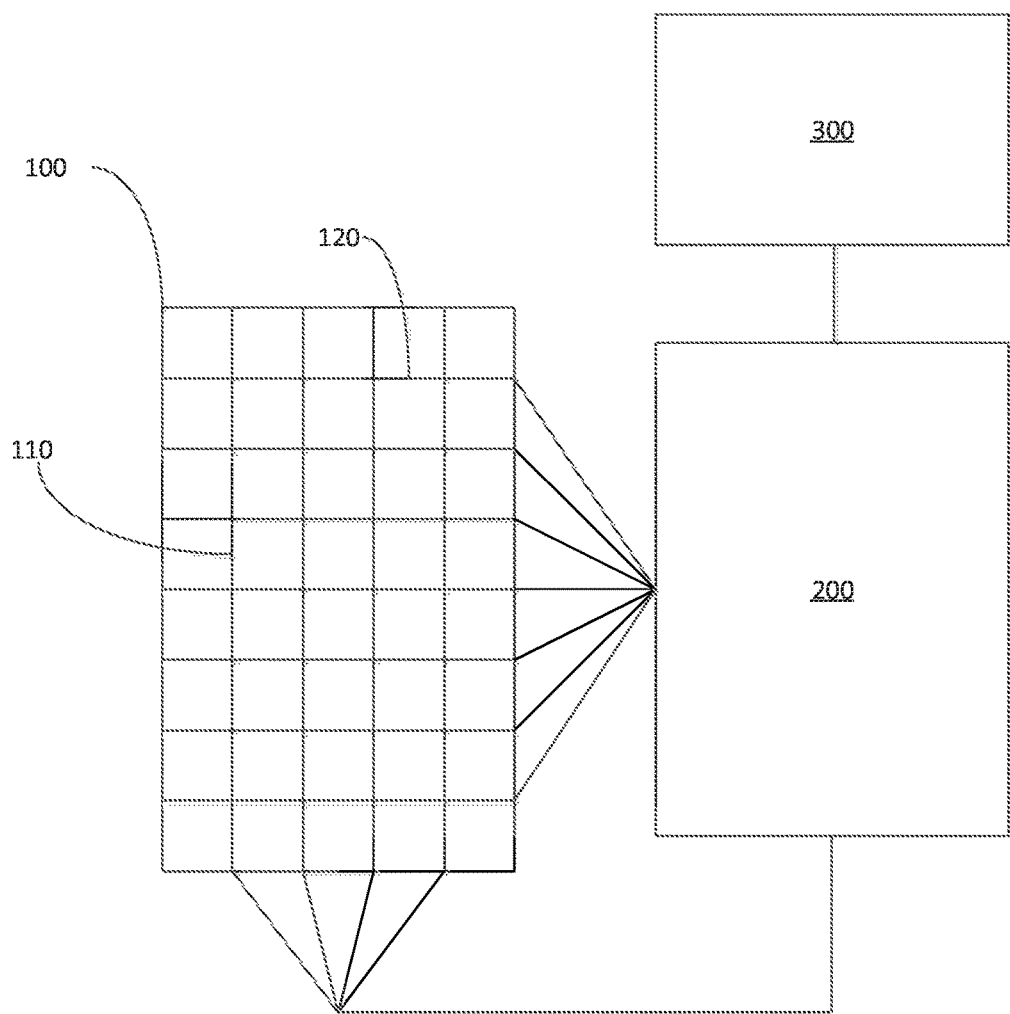
FIG. 1 depicts a schematic diagram of a touch system according to an embodiment of the present invention.
Figure 2:
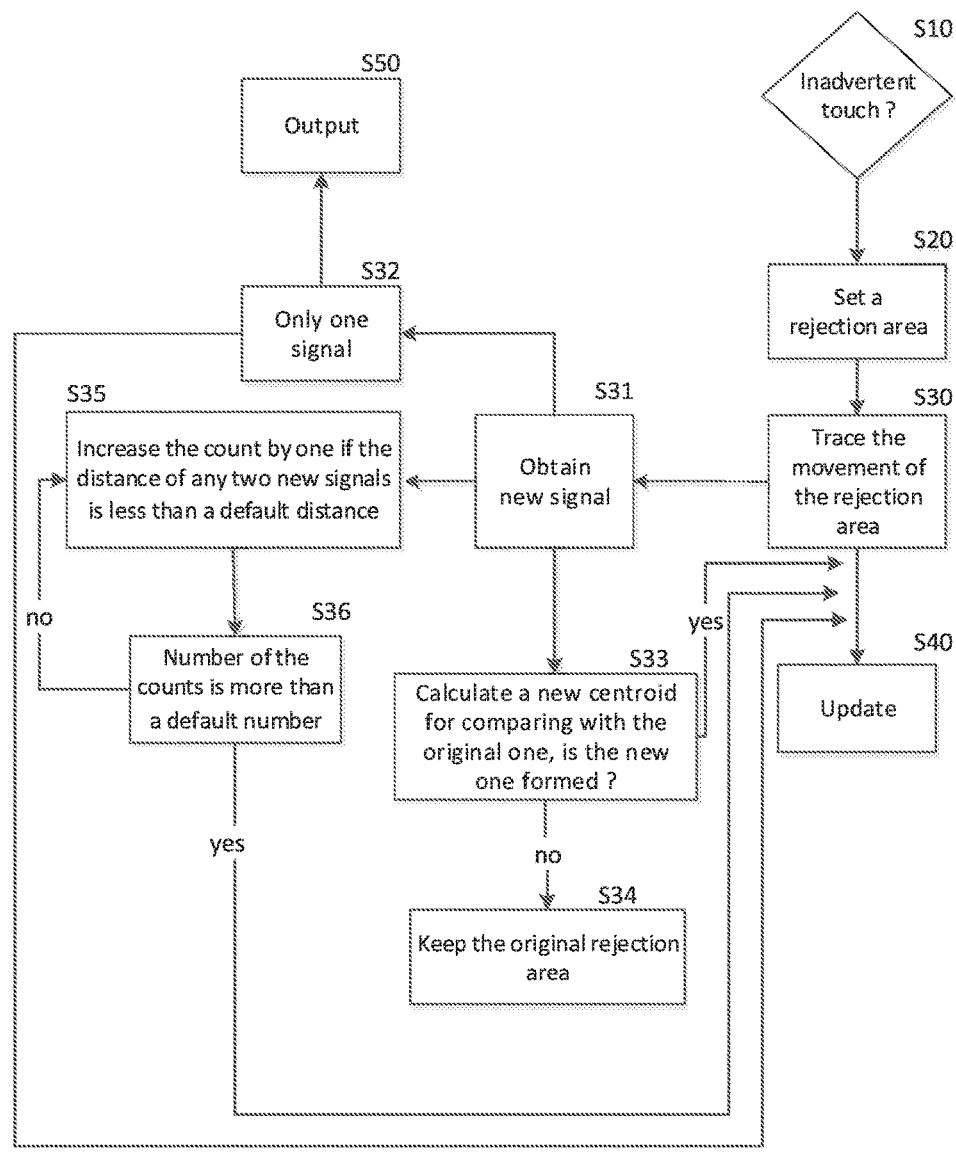
Figure 2A:
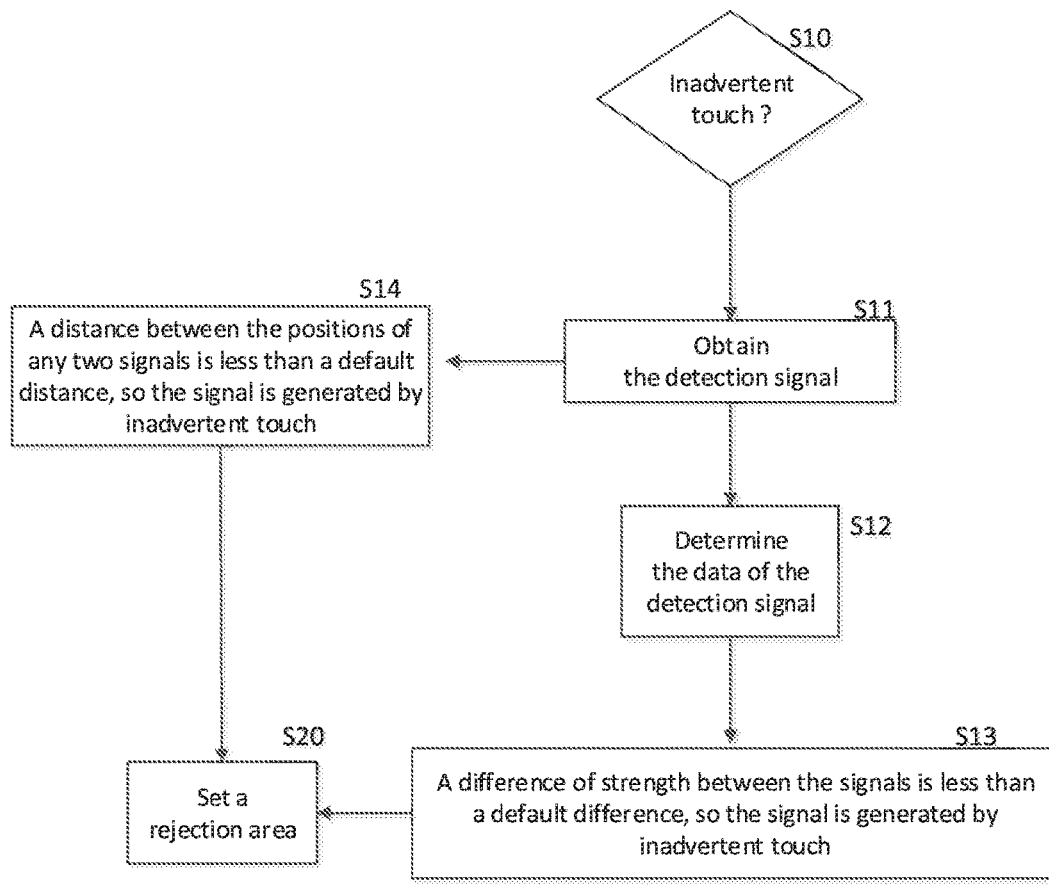

Please refer to FIG. 1, FIG. 1 shows a schematic diagram of a touch system according to an embodiment of the present invention. The touch system includes a touch module 100, a detection module 200 connected to the touch module 100, and a central processing unit (CPU) 300 connected to the detection module 100. It will be understood by one of ordinary skill in the art that the touch system may include other elements that are not relevant to the present invention and are not shown in the drawings.

In the embodiment, the touch module may be a part of the touch screen, or may be a part of a touch panel. The touch module 100 includes a plurality of first electrode 110 and a plurality of second electrode 120 disposed thereon. The first electrode 110 and the second electrode 120 are made of conductive materials in matrix and the second electrode 120 is above the first electrode 110. The first electrode 110 is made of stripes in rows, the second electrode 120 is made of strips in lines. The first electrode 110 and the second electrode 120 are respectively connected to the detection module 200, wherein the connection mode is not necessarily as shown in FIG. 1, and the present invention is not limited to the connection mode. The first electrode 110 may be a driving electrode 110 for connecting to the driving voltage and the second electrode 120 may be a sensing electrode for detecting the voltage change on the sensing electrode if the touch panel is projected capacitive type. The detection module 200 is used to control and detect the first electrode 110 and the second electrode 120.

FIGS. 2, 2A, 2B and 2C depict flow charts of the detection method for avoiding inadvertent touch according to an embodiment of the present invention. The detection module is performed by the detection module and the CPU. The steps of the detection method include:

Step S10: First, determine whether user's palm or wrist inadvertently touches the touch module, wherein the steps of the determining method includes the steps S11-S14 as follows.

Step S11: The touch module is scanned by the detection module for obtaining and measuring a plurality of detection signals. If the number of the detection signal is one, the detection signal is outputted to the CPU. The method including the step S12 or S14 is performed by the detection module to determine whether the user's palm or wrist inadvertently touches the touch module. The method for measuring the detection signals includes driving each of the first electrodes in turn and detecting the voltage change on the second electrodes to obtain the detection signals; or, driving the first electrodes in groups and detecting the voltage change on the second electrodes to obtain the detection signals, and the present invention is not limited to the measuring method.

Step S12: The data of the detection signals including the position and the strength is determined by the detection module.

Step S13: A difference of strength between the detection signals is calculated, or even the difference of strength between any adjacent two of the detection signals is calculated; and, determine whether the difference of strength is less than a default difference. In other words, by analyzing the curve of the strength of the adjacent detection signals, the difference of strength less than the default difference means that the curve of the strength is smooth so that the detection signals is determined to be generated by inadvertent touch; however, the difference of strength greater than the default difference means that the curve of the strength is harsh so that the detection signals is determined to be generated by indicated touch.

Step S14: Follow the step S11. A distance between the positions of any two of the detection signals is calculated, and determine whether the distance is less than a first default distance. In other words, by analyzing the distribution of the position of the detection signals, the distance between any two of the detection signals less than the first default distance means that the distribution of the position of the detection signals is dense so that the detection signals is determined to be generated by inadvertent touch; however, the distance between any two of the detection signals more than the first default distance means that the distribution of the position of the detection signals is thin so that the detection signals is determined to be generated by indicated touch.

Step S20: Follow the step S13 or S14. Set a palm rejection area if the detection signals is determined to be generated by palm or wrist's inadvertent touch. The steps of the setting method include S21-S23.

Step S21: A centroid is calculated on the detection signals. According to the strength, position, area of the detection signals in the previous step, the position of the centroid is obtained by the detection module. In a preferred embodiment, the centroid is calculated on the strength and the position of the detection signals.

Step S22: Set a palm rejection area, which is extrapolated from the centroid. For example, the rejection area is defined as (X,Y)+/−(Xn,Yn) according to the coordinate (X,Y) of the centroid.

Step S23: New detection signals is obtained during a debouncing period, and the new detection signal is discarded if the position of the detection signal is within the rejection area. Next step S30 is as follow.

Step S30: Trace the movement of the rejection area. The steps of tracing method include S31-S36.

Step S31: A plurality of new detection signals is obtained by the detection module for determining whether to update the rejection area.

Step S32: The new detection signal is discarded by the detection module if only one new detection signal is obtained and the position of the only one new detection signal is within the rejection area; otherwise, go to the step S50, the new detection is outputted to the CPU by the detection module if the position of the new detection signal is not within the rejection area.

Step S33: Follow the step 31. Determine whether a new centroid is formed by the new detection signals. According to the new detection signals, a new centroid is calculated to be compared with the original centroid. If the position of the new centroid is the same as that of the original centroid, there is no new centroid and go to the step S34; otherwise, go to the step S40 if there is a new centroid is formed.

Step S34: Keep the original rejection area in step S22 and cease the following step, if the position of the new centroid is the same as that of the original centroid or there is no new centroid is formed.

Step S35: Follow the step S31. Increase the count by one if the distance of any two of the new detection signals is less than a second default distance. It is noted that the second default distance may be the same or different from the first default distance.

Step S36: Go to step 40 and proceed an update for replacing the original rejection area with a new rejection area extrapolated from the new centroid if the number of the counts is more than a default number. If not, go back to step S35.

Figure 3:
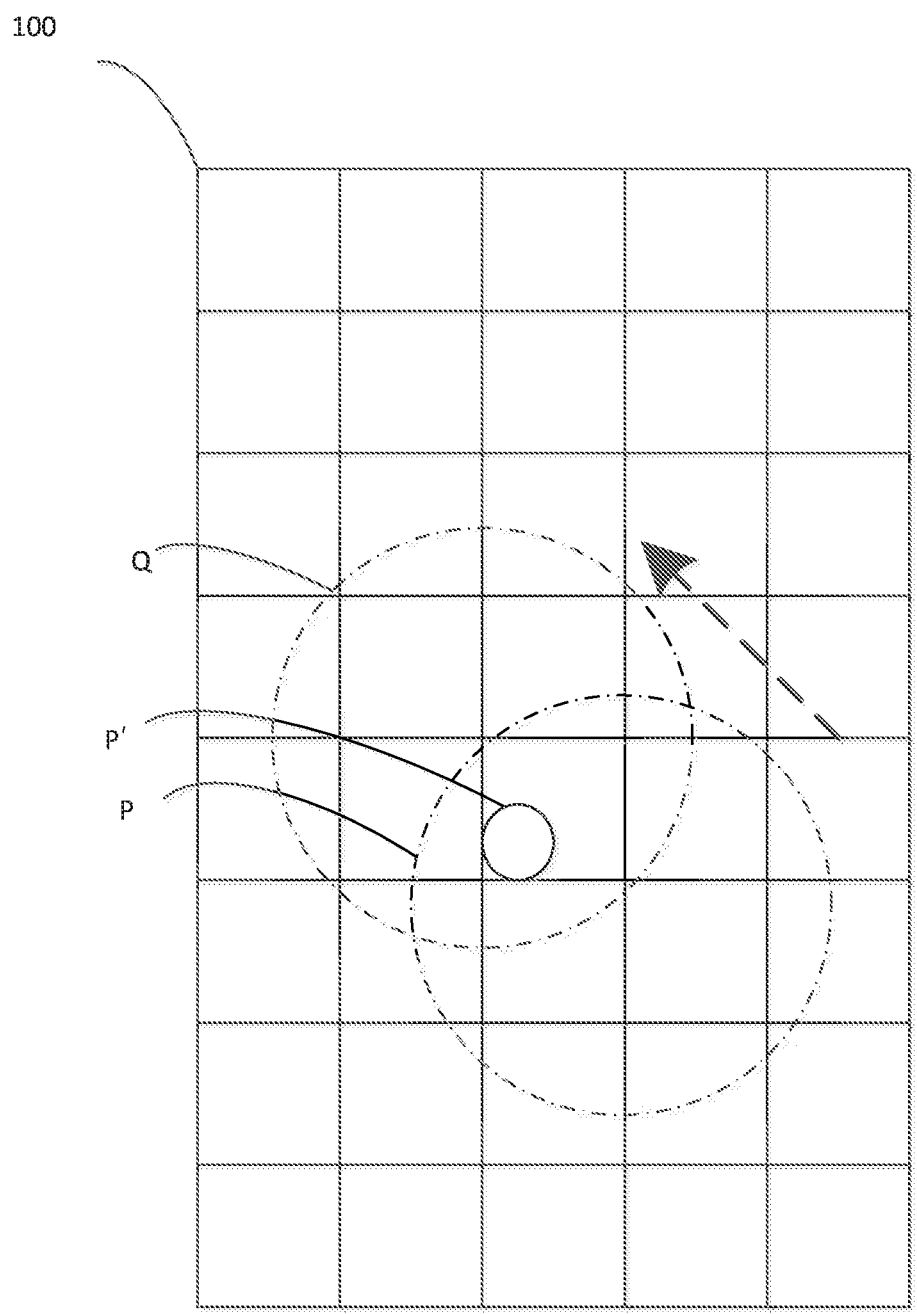
FIG. 3 depicts a schematic diagram of a wrist or palm operating over the touch panel according to an embodiment.

Step S40: Follow the step S32, directly update the rejection area due to only one new detection signal (which is discarded or outputted to CPU). In an embodiment of updating the rejection area, the original rejection area is directly replaced with the new rejection area. In another embodiment of updating the rejection area, the original rejection area is canceled and no new rejection area is set. Follow the step S33 or S36, calculate a rate of the original centroid to the new centroid if there is a new centroid is formed, and set the new rejection area extrapolated from the new centroid if the rate is greater than a default value. As shown in FIG. 3, when users move their palm or wrist on the touch module 100 from the contact area P to area Q as arrowed, users maybe lift their palm or wrist up so that the contact area P is shrunk to a point P'. The point P' may be misjudged as an indication touch such as finger by the detection module. For avoiding this case, the detection method according to the present invention includes a step of proceeding next update each time after a debouncing period is through. The steps of waiting the debouncing period include:

Step S41: The debouncing period is set by the detection module, which is based on the speed of hand lifting or the speed of signal detecting, such as 0.01 second, 0.05 second, 0.1 second or etc.

Step S42: During the debouncing period, proceeding the measurement of the detection signals is maintained and another new detection signals are obtained, but the rejection area is not updated. The detection module maintains to determine whether the position of the new detection signal is within the original rejection area. The new detection signal is discarded if the position is within the original rejection area; if not, the new detection signal is outputted.

Step S43: After the debouncing period is though, go back to the step S40 for proceeding next update and repeat the steps S10 to S20 for determining whether to maintain the original rejection area, to update the new rejection area or to cancel the original rejection area.

Figure 4:
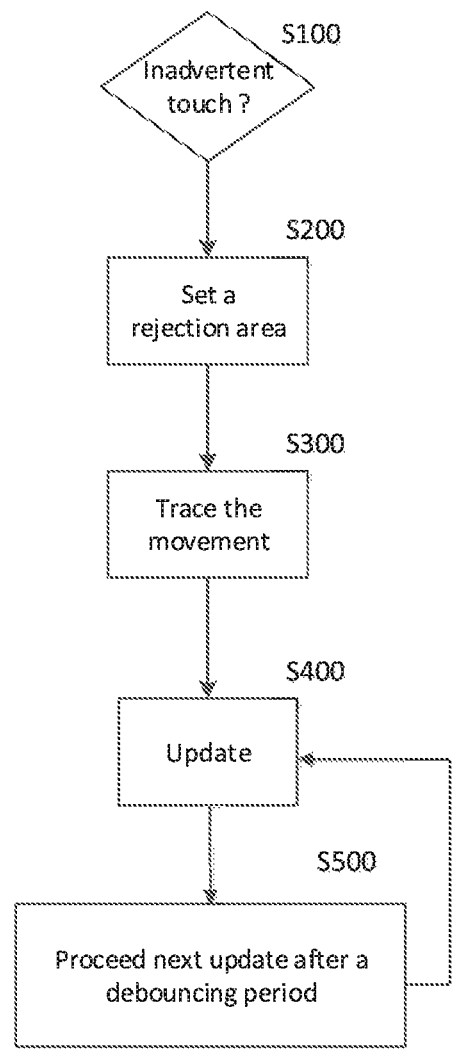
FIG. 4 depicts a flow chart of the detection method for avoiding inadvertent touch according to an embodiment of the present invention.

FIG. 4 depicts a flow chart of the detection method for avoiding inadvertent touch according to an embodiment of the present invention. The steps of the detection method include:

Step S100: Determine whether user's palm or wrist inadvertently touches the touch module, wherein the steps of the determining method may be the same as the steps of S11 to S13, or may be the same as the steps of S11 and S14.

Step S200: Calculate a centroid on the detection signals if the first detection signals are generated by user's wrist or palm inadvertently touching the touch module, and set a rejection area extrapolated from the centroid. The steps of the setting method may be the same as the steps of S21 to S23.

Step S300: Trace the movement of the rejection area. One or more new detection signals are captured by the detection module for be determined whether to update the rejection area. The steps of the determining method is the same as the step of S32 if only one new detection signal is captured. The steps of the determining method may be the same as the steps of S33 to S34, or may be the same as the steps of S35 to S36 if plural new detection signals are obtained.

Step S400: Set a new rejection area by updating the rejection area. The steps of updating method is the same as the step of S40. Moreover, proceed the step S500 before next update each time.

Step S500: Proceed next update after a debouncing period is through.

The present invention sets a rejection area extrapolated from the detection signals generated by user's wrist or palm inadvertently touching, so that the detection signals generated by inadvertent touch is avoided to be misjudged as indication touch in touch system. Furthermore, by tracing the movement of the rejection area to determine whether to update the rejection area, and more by setting a debouncing period, the contact area shrinking to a point is avoided to be misjudged when user lifts up his wrist or palm on the touch panel.

What is claimed is:
1. A detection method implemented by touch system, for detecting inadvertent touch on a touch screen, comprising:
   obtaining a plurality of first detection signals by a plurality of electrodes;
   determining whether a strength difference between the first detection signals is less than a default difference by a central processing unit (CPU);
   calculating a first centroid on the first detection signals if the strength difference between the first detection signals is less than the default difference by said CPU;
   setting a first rejection area extrapolated from the first centroid by said CPU such that inadvertent touch is detected and avoided;
   obtaining a plurality of second detection signals by said plurality of electrodes for determining whether to update the first rejection area;
   calculating a second centroid on the second detection signals by said CPU;
   calculating a rate of the first centroid to the second centroid by said CPU; and
   proceeding an update for replacing the first rejection area with a second rejection area extrapolated from the second centroid, if the rate is greater than a default value by said CPU such that inadvertent touch is detected and avoided.

2. The detecting method according to claim 1, wherein proceeding next update after a debouncing period is through.

3. The detecting method according to claim 1, wherein the first centroid is calculated based on signal strength and positions of the first detection signals.

4. The detecting method according to claim 2, further comprising obtaining a third detection signal during the debouncing period, and determining whether the third detection signal is originated within the first or second rejection area.

5. The detecting method according to claim 1, further comprising obtaining a third detection signal, and discarding the third detection signal if the third detection signal is originated within the first or second rejection area; if not, outputting the third detection signal.

6. The detecting method according to claim 1, wherein after calculating the second centroid, ceasing following steps if the second centroid is positioned as same as the first centroid.

7. A detection method implemented by touch system, for detecting inadvertent touch on a touch screen, comprising:
  obtaining a plurality of first detection signals by a plurality of electrodes;
  determining whether a first distance of two of the first detection signals is less than a first default distance by a CPU;
  calculating a first centroid on the first detection signals if the first distance of the two of the first detection signals is less than a first default distance by said CPU;
  setting a first rejection area extrapolated from the first centroid by said CPU such that inadvertent touch is detected and avoided;
  obtaining a plurality of second detection signals by said plurality of electrodes for determining whether to update the first rejection area;
  increasing a count by one if a second distance of any two of the second detection signals is less than a second default distance; and
  proceeding an update for replacing the first rejection area with a second rejection area extrapolated from a second centroid, if the count is more than a default number such that inadvertent touch is detected and avoided.

8. The detecting method according to claim 7, wherein proceeding next update after a debouncing period is through.

9. The detecting method according to claim 7, wherein the first centroid is calculated based on signal strength and positions of the first detection signals.

10. The detecting method according to claim 8, further comprising obtaining a third detection signal during the debouncing period, and determining whether the third detection signal is originated whitin the first or second rejection area.

11. The detecting method according to claim 7, further comprising obtaining a third detection signal, and discarding the third detection signal if the third detection signal is originated within the first or second rejection area, otherwise outputting the third detection signal.

12. A detection method implemented by touch system, for detecting inadvertent touch on a touch screen, comprising:
  determining whether a plurality of first detection signals are generated;
  calculating a first centroid on the first detection signals by a CPU if the first detection signals are generated;
  setting a first rejection area extrapolated from the first centroid by said CPU such that inadvertent touch is detected and avoided;
  obtaining at least one or more second detection signals by a plurality of electrodes for determining whether to update the first rejection area; and
  determining whether to replace the first rejection area with a second rejection area extrapolated from a second centroid such that inadvertent touch is detected and avoided.

13. The detecting method according to claim 12, wherein proceeding next update after a debouncing period is through.

14. The detecting method according to claim 12, wherein the step of determining whether a plurality of first detection signals are generated comprising:
  calculating a strength difference between the first detection signals, and the first detection signals are generated if the strength difference is less than a default difference.

15. The detecting method according to claim 12, wherein the step of determining whether a plurality of first detection signals are generated comprising:
  calculating a distance of any two of the first detection signals, and the first detection signals are generated if the distance is less than a first default distance.

16. The detecting method according to claim 12, wherein the step of determining whether to replace the first rejection area comprising:
  calculating a second centroid on the second detection signals;
  calculating a rate of the first centroid to the second centroid; and
  replacing the first rejection area with a second rejection area extrapolated from the second centroid if the rate is greater than a default value.

17. The detecting method according to claim 12, wherein the step of determining whether to update the first rejection area comprising:
  increasing a count by one if the distance of any two of the second detection signals is less than a second default distance; and
  replacing the first rejection area with a second rejection area extrapolated from a second centroid if the number of the count is more than a default number.

18. The detecting method according to claim 12, wherein the step of determining whether to update the first rejection area comprising:
  replacing the first rejection area with a second rejection area extrapolated from a position of the second detection signal if obtaining only one second detection signal.

19. The detecting method according to claim 12 wherein the first centroid is calculated based on signal strength and positions of the first detection signals.

20. The detecting method according to claim 13, further comprising obtaining a third detection signal during the debouncing period, and determining whether the third detection signal is originated within the first or second rejection area.

21. The detecting method according to claim 12, further comprising obtaining a third detection signal, and discarding the third detection signal if the third detection signal is originated within the first or second rejection area, otherwise outputting the third detection signal.

* * * * *